Patented July 29, 1952

2,605,269

UNITED STATES PATENT OFFICE 2,605,269

2,3 XYLIDINOANTHRAQUINONE COMPOUNDS AND SULFONATION PRODUCTS THEREOF

Edwin C. Buxbaum, Media, Pa., assignor to E. I. du Pont de Nemours and Company, Wilmington, Del., a corporation of Delaware No Drawing. Application February 23, 1950, Serial No. 145,907

4 Claims. (Cl. 260—374)

1

This invention relates to a new and valuable group of water-soluble anthraquinone dyes, and more particularly to a series of compounds which before sulfonation have the general formula:

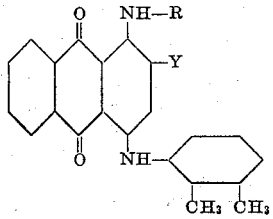

wherein R stands for a radical of the group consisting of H, CH$_3$ and

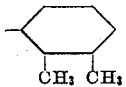

and Y stands for a substituent of the group consisting of

H, CH$_3$, Br and Cl and to the sulfonic acid derivatives of these compounds which exhibit new and unexpected dyeing properties.

Because of certain fastness properties and other characteristics of compounds of the anthraquinone series, a constant search has been made for dyes in that field which would dye wool in colors having the extreme brilliant and tinctorial strength of many of the basic dyes. While a number of colors in the anthraquinone series have been produced for the dyeing of wool, in general these colors are not as bright as is desired and are in many cases deficient in light fastness. In addition, some of these change shade very markedly when subjected to chroming, so that their general utility is materially decreased particularly when mixtures of dyes must be employed to produce certain shades. Where the dye is not to be chromed, of course such mixtures are entirely possible, but where one or more of the components of a mixed color change on chroming, the problem of matching any particular shade becomes difficult or impossible.

There is a particular need in the wool color field for a bright, light-fast violet which does not change shade when chromed, and, while there are products on the market today which dye in a desirable violet shade, they suffer from lack of light-fastness and also from the fact that they turn green when chromed, making their use with other colors undesirable.

2

It is an object of the present invention to produce a series of water-soluble anthraquinone dyes which dye wool, silk and other fibers of similar characteristics in bright shades of good tinctorial strength and which in general do not change color materially upon chroming. A further object of the invention is to produce a new water-soluble anthraquinone dye for wool which dyes wool, silk and fibers of related characteristics in violet shades which are considerably brighter than is now available for that purpose, which does not change upon chroming and which exhibits good light-fastness and other desirable application properties.

I have found that a new series of anthraquinone wool dyes can be produced by condensing 2,3-xylidine (that is, 1-amino-2,3-dimethyl benzene) with amino-halogen anthraquinone compounds which are common intermediates usually employed in the preparation of wool colors. Among these anthraquinone intermediates with which the 2,3-xylidine may be condensed are such compounds as 1-methylamino-4-bromoanthraquinone, 1-amino-2-methyl-4-bromo-anthraquinone, 1-amino-2,4-dihalogenanthraquinones, quinizarin or other compounds of similar configuration in which the 2,3-xylidine can be condensed in either the 1- or 4-, or both the 1- and 4-positions, and in which the 2-position may carry as a substituent in place of the hydrogen the methyl group, bromine or chlorine. The 1,4-arylaminoanthraquinone compounds, which may or may not be substituted in the 2-position, comprise a class of compounds which is frequently used in the preparation of anthraquinone wool dyes. While compounds of this general configuration are known which carry xylidine radicals, the methyl groups on the xylidine radical in the known compounds have always been in the 2,4-, 2,5- or 2,6-position relative to the amino group, and are in general bronzy compounds when pure and dissolved in solvents with characteristic color. When the known xylidino compounds are sulfonated in the usual manner such as by dissolving the base in from 5 to 10 parts of sulfuric acid monohydrate and then adding 25% to 65% oleum, they give water-soluble dyes which are distinctly different in shade from the dyes which I have found can be produced from the 2,3-xylidinoanthraquinone compounds under special sulfonation conditions.

I have found that, when the 2,3-xylidine compounds as above formulated are sulfonated under special conditions, widely different dyes are obtained which exhibit entirely unexpected shades and have the further unexpected property that they do not change color to any great degree when chromed. The difference in shade of the dye obtained by the special sulfonation procedure which I employ for this particular class of compounds is a hypsochromic one in which the shade change goes in the color of the arrow in the following usual spectrum abbreviation:

vibgyor
←

The particular conditions for sulfonation of the anthraquinone bases of the above formula which I have found produce the unexpected change in shade and dyeing characteristics of the resulting water-soluble compounds consists in carrying out the sulfonation in oleum of from 3% to 15% $SO_3$ content at temperatures of from 20° to 60° C. and for a period of time of from 6 to 18 hours or more. The preferred conditions which I have found to give maximum yield of the desired new dyes is where the oleum has from 7% to 9% $SO_3$ content and the sulfonation is carried out for a period of from 6 to 18 hours at a temperature of from 20° to 30° C. The conditions specified above in the broader range produce the desired new dyes, but lower yields of these particular sulfonic acid derivatives are obtained. Where using oleum of from 7% to 9% $SO_3$ and temperatures of from 20° to 30° C., the time for carrying out the reaction may be extended any number of hours although it is found that 6 is the preferred minimum. Holding of the sulfonation mass more than 18 hours at the preferred temperature does not appear to materially decrease the yield but merely adds to the cost of the operation.

The new sulfonic acid derivatives produced by this process are isolated by adding water to the sulfonation mass until the acidity is reduced to approximately 70% sulfuric acid, at which point most all of the desired new sulfonic acid derivatives are precipitated out in substantially pure form. The crystalline product is filtered off and preferably washed with brine which converts it to the sodium salt, although the free acid may itself be isolated by washing the crystals free from sulfuric acid with a volatile acid such as hydrochloric acid and then drying. Alternatively, the acid cake may be slurried in an aqueous brine solution, neutralized with soda ash or other alkali so that the alkali metal salt of the resulting sulfonic acid is obtained. The free sulfonic acid derivative may of course be converted to any salt by reacting with the base or water-soluble salt of any metal desired.

The ordinary sulfonic acid derivatives, which are of considerably different shade and which may be present in the sulfonation mass, remain in solution in the sulfuric acid of 70% and it is by this separation method that the actual yield of the desired new sulfonic acid derivatives is ascertained. The dye which precipitates out in substantially pure form may be recrystallized from sulfuric acid if desired, although in most cases it will be found to be in sufficiently pure form for commercial use.

While even the preferred conditions set out above do not give a 100% yield of the sulfonic acid compounds, the particular sulfonic acid which precipitates out of the 70% sulfuric acid is substantially free from the ordinary type of sulfonic acid derivative which dyes wool in quite different shades. The sulfonation procedure which I employ for this particular group of xylidinoanthraquinone compounds introduces more than one sulfonic acid group into the dye although the mechanism of the reaction is not definitely known, nor is the position of the sulfonic acid groups. Where there are two xylidino groups in the dye molecule this preferred method of sulfonation introduces more than two sulfonic acid groups into the dye molecule, indicating that the first sulfonic acid group in each case probably enters the benzene ring of the xylidino radical, while further sulfonation introduces a sulfonic acid group into the anthraquinone nucleus or otherwise changes the chemical constitution of the dye.

To produce the new dyes by this particular sulfonation process it has been found that the 2,3-xylidino radical is a required substituent of the anthraquinone dye base for isomeric xylidino-anthraquinone compounds when sulfonated by the same procedure do not give this unexpected shift in shade nor will any of the similarly substituted arylaminoanthraquinones such as the phenyl or tolyl substituted aminoanthraquinones.

The change in color produced by the particular sulfonation procedure which I employ is extremely great for the xylidino compound when sulfonated by the usual procedure which is a blue, becomes violet, and green becomes blue-green, red becomes orange, etc.

The following examples are given to illustrate the invention. The parts used are by weight.

*Example 1*

One hundred (100) parts of 1-amino-2-methyl-4-bromoanthraquinone are condensed with 400 parts of 2,3-xylidine (2,3-dimethylaniline), 100 parts of ammonium acetate, 300 parts of water and 1 part of copper acetate at 100° to 105° C. for 12 hours. The condensation mass is then cooled to 80° C. and diluted with an equal amount of ethyl alcohol. It is then cooled to 20°–30° C. over a period of eight hours. The crystallized base is filtered off, washed with ethyl alcohol, hot water and dried at 100° C. The crystalline bronzy compound is pure 1-amino-2-methyl-4-(2'-3'-dimethylanilino)-anthraquinone and has a melting point of 204° to 205° C.

Forty (40) parts of the above base are dissolved in 1200 parts of 7% oleum at 20° to 30° C. in one hour. The sulfonation mass is allowed to stir 16 hours at 20° to 30° C. One hour after the base has been dissolved in the sulfuric acid, a drop of the reaction mass in water will show a typical blue coloration. When the sulfonation has been completed (after about 16 hours), a drop of the sulfonation mass in water shows a distinctly different shade of violet. 670 parts of water are then added over a period of from 2 to 4 hours at a temperature not to exceed 35° C. When all the water has been added, the sulfonation is allowed to stir for an additional six hours. The dye crystallizes out in well-formed "football shaped" crystals. These crystals are filtered off, sucked dry and washed with 25% brine until almost acid-free. The cake is then slurried in 1000 parts of 25% brine, neutralized with soda ash, filtered and dried. The sulfonated dye dyes wool in very bright violet shades of great brilliancy and good fastness properties. The dyeings are not essentially changed on chroming.

*Example 2*

One hundred (100) parts of ortho-dichlorobenzene and 48 parts of 2,3-xylidine are heated to 50°–60° C. Sixty (60) parts of 1-amino-2-methyl-4-bromoanthraquinone are then added and the temperature raised to 100° C. 0.6 part of copper acetate and 24 parts of potassium acetate are then added and the temperature is raised to 160°–165° C. and held there for 10 hours. When the condensation is complete, the mass is cooled to 65° C. and poured into 200 parts of methyl alcohol and agitated for one-half hour. It is then filtered, washed with additional methyl alcohol and hot water and dried. It consists essentially of 1-amino-2-methyl-4-(2',3'-dimethylanilino)-anthraquinone as prepared in Example 1, and can be sulfonated in the same manner.

*Example 3*

Fifteen (15) parts of 1-chloroanthraquinone are reacted with 75 parts of 2,3-xylidine, 8 parts of potassium acetate and 0.2 part of copper acetate at 160°–165° C. for 10 hours. When condensation is complete, the mass is cooled to 70° C. and 100 parts of ethyl alcohol are added. The diluted condensation is then allowed to cool to room temperature over a period of eight hours and the crystalline base formed is filtered, washed with ethyl alcohol, hot water and dried. It consists of 1-(2',3'-dimethylanilino)-anthraquinone and dissolves in organic solvents with a bright red color. When sulfonated by the usual sulfonation methods, it gives a red dye which dyes wool in the expected red shade.

When sulfonated according to the following procedure, however, clear orange-brown shades can be obtained from this base. Six (6) parts of the base obtained in Example 3 are dissolved in 60 parts of 7% oleum in one hour at 20°–35° C. The temperature is then raised to 60°–65° C. and held there for 12 hours. The mass is cooled to 30° C., poured into ice and water and isolated in the usual manner. A dye of orange-brown shade on wool exhibiting good fastness properties is obtained.

If the 1-(2',3'-dimethylanilino)-4-methylanthraquinone (obtained by condensing 2,3-xylidine with 1-chloro-4-methylanthraquinone) is sulfonated in the manner described above, a compound which dyes wool in chocolate-brown shades is obtained, as distinguished from a red dye obtained when it is sulfonated by the usual procedure.

*Example 4*

Ten (10) parts of 1-methylamino-4-bromoanthraquinone are refluxed at 100°–105° C. for 12 hours with 40 parts of 2,3-xylidine, 30 parts of water, 10 parts of ammonium acetate and 0.2 part of copper acetate. When the condensation is complete, the mass is cooled and diluted with an equal volume of ethyl alcohol and allowed to cool to 20°–30° C. over a period of 6 hours. The crystalline base is filtered off, washed with alcohol, hot water and dried. It consists of 1-methylamino-4-(2',3'-dimethylanilino)-anthraquinone.

When sulfonated by the process outlined in the preceding examples, a very red-blue of good fastness properties is obtained. It is very much redder than the very greenish-blue obtained by the usual sulfonation of the 1-methylamino-4-(2',3'-dimethylanilino)-anthraquinone with sulfuric acid monohydrate and strong oleum.

*Example 5*

Seventy (70) parts of 2,3-xylidine, 30 parts of ethyl alcohol and 7 parts of boric acid are heated to 65°–70° C. Six (6) parts of quinizarin and 4.5 parts of leuco quinizarin are then added and the reaction mass held 4 hours at 90°–95° C. When the condensation is complete, the mass is cooled and diluted with ethyl alcohol. The crystalline mass is filtered, washed with alcohol and dried. It consists of 1,4-di-(2',3'-dimethylanilino)-anthraquinone.

Ten (10) parts of 1,4-di-(2',3'-dimethylanilino)-anthraquinone is dissolved in 150 parts of 6.5% oleum at 60°–65° C. for 16 hours until no further discernible color change is noted. The sulfonation mass is then poured into a mixture of ice and water containing 5% salt. The precipitated color is filtered off, washed with brine until acid-free, and dried. It dyes wool in blue shades of good fastness properties.

*Example 6*

Ten (10) parts of 1-amino-2,4-dibromoanthraquinone are condensed with 40 parts of 2,3-xylidine, 30 parts of water, 10 parts ammonium acetate and 0.2 part of copper acetate at 100°–110° C. for 8 hours. The reaction mass is cooled, diluted with an equal amount of ethyl alcohol and allowed to stir at 20°–30° C. for a few hours. It is then filtered off, washed with alcohol and water and dried. It consists of 1-amino-2-bromo-4(2',3'-dimethylanilino)-anthraquinone. If sulfonated by the usual sulfonation conditions employed by those skilled in the art, a blue dye for wool is obtained. If the special sulfonation conditions outlined in Example 5 are employed, a blue-violet of good properties is obtained. If one uses 1-amino-2-chloro-4-bromoanthraquinone in place of the 1-amino-2,4-dibromoanthraquinone, a similar dye is obtained.

I claim:

1. 2,3-xylidinoanthraquinone compounds of the general formula:

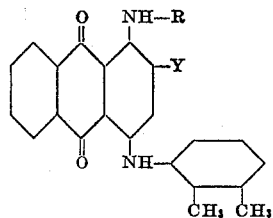

in which R stands for a substituent of the group consisting of H, CH₃,

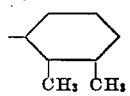

and Y stands for a substituent of the group consisting of

H, CH₃, Br, Cl and their sulfonation products.

2. The sulfonation products obtained by sulfonating the non-sulfonated compounds of claim 1 in oleum of from 3% to 15% SO₃ for a period of from 6 to 30 hours at temperatures of from 20° to 60° C. and which are crystallized in relatively pure form from 70% sulfuric acid.

3. The xylidinoanthraquinone compound of the formula:

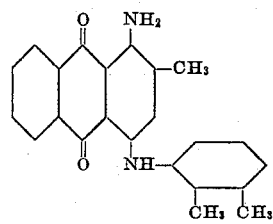

and its sulfonation derivatives.

4. The compound obtained by sulfonating a compound of the formula:

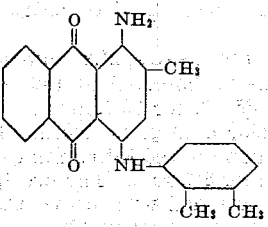

in oleum of from 7% to 9% $SO_3$ from 6 to 30 hours at temperatures of from 20° to 30° C.

EDWIN C. BUXBAUM.

REFERENCES CITED

The following references are of record in the file of this patent:

UNITED STATES PATENTS

| Number | Name | Date |
|---|---|---|
| 2,101,094 | Peter | Dec. 7, 1937 |
| 2,121,928 | Peter | June 28, 1938 |
| 2,226,909 | Peter | Dec. 31, 1940 |

FOREIGN PATENTS

| Number | Country | Date |
|---|---|---|
| 457,386 | Great Britain | Nov. 23, 1936 |
| 215,943 | Switzerland | Nov. 1941 |